(12) United States Patent
Granger et al.

(10) Patent No.: US 12,479,347 B2
(45) Date of Patent: Nov. 25, 2025

(54) HINGED CARGO LINER

(71) Applicant: MACNEIL IP LLC, Bolingbrook, IL (US)

(72) Inventors: Ryan Granger, Lemont, IL (US); Eric Griesinger, Plainfield, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 366 days.

(21) Appl. No.: 17/964,161

(22) Filed: Oct. 12, 2022

(65) Prior Publication Data

US 2024/0123887 A1    Apr. 18, 2024

(51) Int. Cl.
*B60N 3/04*     (2006.01)

(52) U.S. Cl.
CPC ............. *B60N 3/048* (2013.01); *B60N 3/044* (2013.01)

(58) Field of Classification Search
CPC .......... B60N 3/048; B60N 3/044; B60N 3/04; B60N 2/6027; B60N 2/5825; B60N 2/6009; B60N 2002/363; B60R 13/01; B60R 13/011; B60R 13/0268; B60R 13/013; B60R 2013/015; B60R 2013/018
USPC .............................................. 296/39.1, 97.23
See application file for complete search history.

(56) References Cited

U.S. PATENT DOCUMENTS

| | | | |
|---|---|---|---|
| 2,188,342 A | 1/1940 | England | |
| 2,709,105 A | 5/1955 | Kramer | |
| 3,288,187 A | 11/1966 | Wheaton | |
| 3,390,912 A | 7/1968 | Stata | |
| 3,401,975 A | 9/1968 | Oger | |
| 4,280,729 A | 7/1981 | Morawski | |
| 4,693,507 A | 9/1987 | Dresen et al. | |
| 4,848,826 A * | 7/1989 | Kuwabara | B60N 2/3009 296/37.16 |
| 4,979,772 A * | 12/1990 | Carey | B60N 2/3011 296/97.23 |
| 5,254,384 A | 10/1993 | Gordon | |
| 5,322,335 A * | 6/1994 | Niemi | B60R 13/01 296/97.23 |
| D377,780 S | 2/1997 | Macneil | |
| 6,431,629 B1 | 8/2002 | Emery | |

(Continued)

FOREIGN PATENT DOCUMENTS

| | | | | |
|---|---|---|---|---|
| DE | 10012590 A1 * | 9/2001 | | B60N 2/3013 |
| JP | H08295168 A * | 11/1996 | | |

(Continued)

OTHER PUBLICATIONS

Tomita et al. (JP H08295168 A), machine translation (Year: 1996).*

(Continued)

*Primary Examiner* — Amy R Weisberg
*Assistant Examiner* — Wenwei Zhuo
(74) *Attorney, Agent, or Firm* — PERKINS IP LAW GROUP LLC; Jefferson Perkins

(57) ABSTRACT

An injection-molded cargo liner has a floor panel, at least one seat back panel and a plurality of accordion pleats joining the floor panel to the seat back panel. Living hinges between adjacent ones of the panels and pleats are made by reducing thickness. The pleats allow the seat back panel to travel with the seat back, as the seat back is moved forward and down. In this way, the cargo liner provides a continuous barrier against dirt and water.

5 Claims, 12 Drawing Sheets

(56) References Cited

U.S. PATENT DOCUMENTS

| | | | |
|---|---|---|---|
| 6,793,872 | B1 | 9/2004 | Buss |
| 7,255,391 | B2 * | 8/2007 | Bristow .................. B32B 27/32 |
| | | | 296/214 |
| 8,852,711 | B2 * | 10/2014 | Preisler ............... B60R 13/0275 |
| | | | 428/116 |
| 10,773,632 | B2 * | 9/2020 | Salter ....................... B60P 3/00 |
| 11,987,159 | B2 * | 5/2024 | Koinuma ................. B60N 2/36 |
| 2006/0255611 | A1 * | 11/2006 | Smith ...................... B60N 2/36 |
| | | | 296/37.16 |
| 2008/0185866 | A1 * | 8/2008 | Tarrant ...................... B60R 5/04 |
| | | | 296/97.22 |
| 2010/0055411 | A1 * | 3/2010 | Stanesic ................. B60N 3/044 |
| | | | 428/192 |
| 2013/0255176 | A1 * | 10/2013 | Roberts .................. E04G 1/153 |
| | | | 181/290 |
| 2014/0070560 | A1 * | 3/2014 | Young .................. B60R 13/013 |
| | | | 296/97.23 |
| 2015/0175090 | A1 * | 6/2015 | Ha ........................ B60R 13/013 |
| | | | 296/65.09 |
| 2022/0297586 | A1 * | 9/2022 | Maxwell ................ B60N 3/044 |

FOREIGN PATENT DOCUMENTS

| | | | | |
|---|---|---|---|---|
| JP | 2020192941 A | * | 12/2020 | ............ B60R 13/011 |
| WO | WO-2007025820 A2 | * | 3/2007 | ............... B60N 2/36 |

OTHER PUBLICATIONS

Abe et al. (JP 2020192941 A), machine translation (Year: 2020).*
Ehrhard (DE 10012590 A1), machine translation (Year: 2001).*
Amazon.com—WeatherTech Cargo Trunk Liner Aug. 25, 2021 Retrieved from internet: <https://www.amazon.com/WeatherTech-Custom-Cargo-Nissan-401405/dp/B09DMRQ1JK?th=1> (Year: 2021).*
Amazon.com—WeatherTech Cargo Trunk Liner Kia Aug. 25, 2021 Retrieved from internet: <https://www.amazon.com/WeatherTech-Cargo-Trunk-Sorento-401407/dp/B09DMSH3YF/?th=1> (Year: 2021).*
Amazon.com—Husky Liners Weatherbeater Cargo Liner Aug. 3, 2022 Retrieved from internet: <https://www.amazon.com/Husky-Liners-Weatherbeater-Cargo-Liner/dp/B0B8GMS46T?th=1> (Year: 2022).*
Ford Explorer ST Husky Weather beater Split Cargo Liner—YouTube—Jun. 28, 2021 Retrieved from internet: <https://www.youtube.com/watch?v=1WL5kABnR30> (Year: 2021).*
Toyota Canada—Seatback Cargo Liner—YouTube 01162015 Retrieved from internet: <https://www.youtube.com/watch?v=nBDQdYrBjbl> (Year: 2015).*
Someschan et al. (WO 2007025820 A2), machine translation (Year: 2007).*
"Bagagerumsmattor" downloaded from http://www.autoform.se/sv/produkter_bagagerumsmattor.htm on Oct. 20, 2004.

* cited by examiner

HINGED CARGO LINER

BACKGROUND OF THE INVENTION

Sport utility vehicles (SUVs) and minivans typically have a cargo area to the rear of the rearmost row of seats. It is known to provide cargo liners for the floors of these cargo areas. Many cargo liners are custom-designed for particular makes, models and year ranges of vehicles. The cargo area of SUVs and minivans can be quite large. One conventional process for manufacturing such cargo liners is to thermoform them from sheets of thermoplastic polymer compound where the sheets have a uniform thickness.

Cargo liners have been popular, because the cargo areas they protect are otherwise subject to dirt, grime and fluids from the items (or pets) that are placed on them. But the forward boundary of these cargo areas is typically defined by a seat back, or, if the rearmost row of seats is split, by two such seat backs, which often can be individually folded down or their angle of inclination adjusted to the comfort of the occupant. The seat backs are exposed to dirt and fluids almost as much as the cargo area floor.

A problem with attempting to protect such seat backs is that they move around seat hinges. In many SUVs and vans, it is possible to lower the seat backs in a forward direction so that the seat back becomes planar with the floor, forwardly extending the surface area of the cargo area. When this is done, in many situations the seat back not only pitches forward and downward around its rear/bottom hinge, but translates forward in space; the seat back movement is translational as well as angular. A related problem is that any protection that might be provided to the seat back typically will not be continuous with the protective barrier provided by the cargo liner. Therefore, further improvements relative to the protection of SUV and minivan cargo areas and seat backs could be made.

SUMMARY OF THE INVENTION

The present invention provides a cargo liner that protects both the floor of the cargo area in a minivan or SUV, and the seat back(s) that function as the forward boundary of the cargo area. The cargo liner and all components of it are integrally molded of a thermoplastic material, and the cargo liner is adapted to assume an unfolded configuration and a folded configuration. A first panel of the cargo liner is adapted to be placed on the floor of the cargo area. The first panel has a top surface, a bottom surface and a floor panel thickness between its top and bottom surfaces that is substantially uniform. A hinge connects a front margin of the first panel to a rear margin of a second panel. The second panel has a second panel thickness between its top and bottom surfaces that also is substantially uniform. A hinge thickness, measured between a hinge upper surface and a hinge lower surface, is less than the thicknesses of the first and second panels. This creates a living hinge between the first and second panels. When the cargo liner is in the folded configuration, the second panel may assume an acute angle, up to and including 90 degrees, relative to the first panel.

In one embodiment, the living hinge is made possible by injection-molding the cargo liner from a thermoplastic material such as a thermoplastic elastomer (TPE). Using injection molding as a molding technique permits the practitioner of this invention to create a hinge by reducing the otherwise uniform thickness of the liner in the hinge area. In one embodiment, this is done selectively. As seen in an unfolded configuration, one surface of the hinge is held to be substantially flat and continuous with neighboring panel surfaces. The opposing surface of the hinge, in the direction of bending, is formed to be concave.

According to another aspect of the invention, a floor panel is connected to a seat back panel by at least two intermediate panels. These intermediate panels, which herein are called accordion pleats, allow a seat back panel to be attached to a respective seat back, even where that seat back is displaced both angularly and translationally when it is moved between passenger-accepting and cargo area-extending positions. A first hinge connects the front margin of the floor panel to a rear margin of a first pleat of the accordion pleats. A second hinge connects a front margin of the first pleat to a rear margin of a second pleat. A third hinge connects a front margin of the second pleat to a "rear", or bottom, margin of a seat back panel. When the vehicle seat is pitched forward and down, and is forwardly translated in space, the attached seat back panel moves with it. The accordion pleats open out from a folded state to accommodate this rotation and translation. The cargo liner then assumes an unfolded configuration in which the floor panel is still positioned on the cargo area floor, the seat back panel is still affixed to the seat back, and a web of thermoplastic material continues to join the two, presenting a longitudinally continuous barrier to fluid and dirt. In the unfolded configuration, the first pleat makes at least an obtuse angle with the floor panel, the second pleat makes at least an obtuse angle with the first pleat, and the second pleat makes at least an obtuse angle with the seat back panel. When the seat back is in the passenger-accepting position, the cargo liner assumes a folded configuration, in which the first pleat makes an acute angle with the floor panel, the second pleat makes an acute angle with the first pleat, and the second pleat makes an acute angle with the seat back panel.

Many minivans and SUVs have second row seats that are fashioned as a split bench. In these seats, the user may choose to lower one side of the seat back, but not the other. One embodiment of the present invention accommodates this by providing two seat back panels which are independently connected to the floor panel by separate sets of accordion pleats. Whereas in a nonsplit embodiment there are first, second and third hinges between the front margin of the floor panel and the rear margin of the seat back panel, in a split-back embodiment, there are corresponding fourth, fifth and sixth hinges between the front margin of the floor panel and the rear margin of a second seat back panel. The fourth hinge connects the front margin of the floor panel of the cargo liner to a rear margin of a third pleat of the accordion pleats. The fifth hinge connects the front margin of the third pleat to a rear margin of a fourth pleat of the accordion pleats. The sixth hinge connects the front margin of the fourth pleat to a rear or bottom margin of the second seat back panel. If the rear row of seats has more than two independently articulating sections, further seat back panels and further sets of pleats are provided.

In an embodiment, the thicknesses of the hinges are smaller than are the neighboring thicknesses of the respective pleats/panels that they connect. In one embodiment, upper surfaces of the first and fourth hinges are upwardly concave, lower surfaces of the second and fifth hinges are downwardly concave, and upper surfaces of the third and sixth hinges are upwardly concave. In an unfolded configuration, the opposed surfaces of these hinges are substantially flat and continuous with the adjacent surfaces of the panels that they connect.

The present invention enables a novel method of protecting a cargo area of a vehicle. A cargo liner is integrally molded of a thermoplastic material to include a floor panel, at least one seat back panel, and at least first and second accordion pleats connecting the floor panel to the seat back panel. The user places the floor panel on, or attaches the floor panel to, a floor of the cargo area of the vehicle. To complete the installation of the cargo liner in the vehicle, the user attaches the seat back panel to a seat back of a passenger seat. In one embodiment, this may be done by hook and loop fasteners.

The user may then place the seat back into either a passenger-accepting position, in which a passenger may sit in the seat, or a cargo-area extending position, in which the seat back becomes an extension of the cargo area. In the passenger-accepting position, the seat back is vertical or backwardly angled. Responsive to placing the seat back into this position, the first pleat is folded to have an acute angle with the floor panel, and the second pleat is folded to be disposed at acute angles to the first pleat and the seat back panel. To place the seat back in a cargo area extending position, the user forwardly and downwardly rotates the seat back around a seat hinge, and at the same time forwardly translates the seat back in space. Responsive to the placement of the seat back in the cargo area-extending position, the angle of the second pleat to the seat back panel is increased so that it is at least obtuse, the angle of the first pleat to the second pleat is increased so that it is at least obtuse, and the angle of the first pleat to the floor panel is increased so that is it at least obtuse. In this manner, the cargo liner protects the seat back and the cargo area floor with a longitudinally continuous barrier against water and dirt, regardless of the seat back position.

In the common instance where there is a second seat that may be lowered or raised independently of the first, and in one embodiment, the cargo liner is integrally molded to further include a second seat back panel, and third and fourth accordion pleats connecting the second seat back panel to the floor panel. The user attaches the second seat back panel to the second seat back. The user next decides whether to place the second seat back into a passenger-accepting position or a cargo area-extending position. Responsive to the step of placing the second seat back in the passenger-accepting position, and independently of the steps taken in respect of the first seat back, the first seat back panel, the first pleat and the second pleat, the third pleat is folded so as to assume an acute angle with the floor panel, and the fourth pleat is folded so as to assume an acute angle with the third pleat and an acute angle with the second seat back panel. When the user wishes to place the second seat back in a cargo area-extending position, the user rotates the second seat back forwardly and downwardly and at the same time forwardly translates the second seat back in space. The attached second seat back panel therefore downwardly rotates and forwardly translates with the second seat back. The angle between fourth pleat and the second seat back panel becomes at least obtuse, the angle between the third pleat and the fourth pleat becomes at least obtuse, and the angle between the third pleat and the floor panel becomes at least obtuse. In this way, the cargo liner may protect the second seat back and the cargo area floor with a longitudinally continuous barrier against water and dirt, regardless of the position assumed by the second seat back, and regardless of the position in which the first seat back is placed.

BRIEF DESCRIPTION OF THE DRAWINGS

Further aspects of the invention and their advantages can be discerned in the following detailed description as read in conjunction with the drawings of exemplary embodiments, in which.

DETAILED DESCRIPTION

Figure 1:
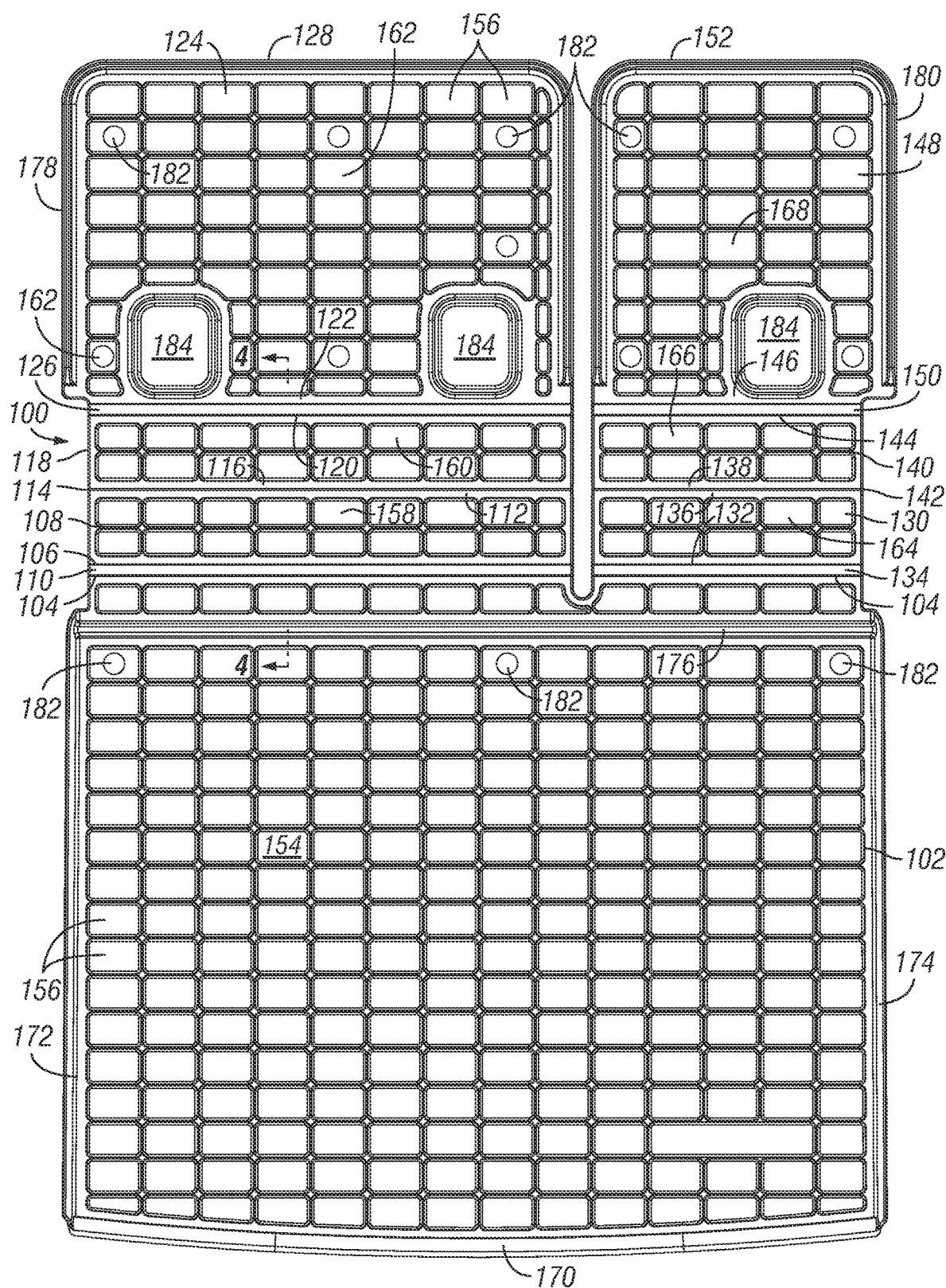
FIG. 1 is a top view of a hinged cargo liner according to the invention, in an unfolded configuration.

One embodiment of the invention is illustrated in plan view in FIG. 1. The cargo liner 100 has a floor panel 102 that is meant to be fitted to the floor of a cargo area of a minivan, SUV or like vehicle. The particular cargo liner 100 illustrated in FIGS. 1-7 is custom-designed to fit to the cargo area and seat backs of a 2019 Jeep Cherokee, but other embodiments of the invention may be provided to fit other makes, models and year ranges of vehicles, such as the vehicle illustrated in FIGS. 8-10. The floor panel 102 has a straight and transversely oriented front margin 104 that is connected to a rear margin 106 of a first, left accordion pleat 108 by a first hinge 110. A front margin 112 of the first pleat 108 is connected by a second hinge 114 to a rear margin 116 of a second, left accordion pleat 118. A front margin 120 of the second pleat 118 is connected to a rear or bottom margin 122 of a first, left seat back panel 124 by a third hinge 126. The first seat back panel has a front (or top) margin 128 that is remote from rear margin 122.

This embodiment is being described as it exists in a substantially flat, unfolded configuration. "Front" and "rear" are assigned to panel margins with respect to a fore-and-aft direction of vehicle motion, and as those margins are disposed in the unfolded configuration. A "top" surface of a panel or hinge will be above a "bottom" surface of same when the cargo liner 100 is in this unfolded configuration. "Transverse", or side-to-side, is a direction in the same plane as fore and aft, but at ninety degrees to this direction. But the cargo liner 100 is capable of assuming at least one other configuration in which the panels are in folded relation to each other, and in those conditions a "rear" margin of one of the panels may actually be to the rear of a "front" margin of the same panel or of another one.

The cargo liner 100, and all components of it, are integrally molded of a thermoplastic material. In one embodiment, the cargo liner 100 is integrally injection-molded from a thermoplastic elastomer (TPE) compound. The use of injection molding permits the disclosed designs of the hinges 110, 114 and 126, and also of further sets of hinges, all of which will be hereinafter described.

The panels 102 and 124 are orders of magnitude longer and wider than they are thick. In the illustrated embodiment, the width of floor panel 102 is about 50 in. while the length is about 63 in. The lateral dimensions of panels 102 and 124, and possibly of pleats 108 and 118, will vary from those shown for cargo liners meant to fit other makes, models and year ranges. In particular, the fore and aft length of each of pleat 108 and 118 will depend on the amount of forward translational travel of a foldable seat back to which seat back panel 124 is attached when that seat back is rotated forward to a cargo area-extending position from a passenger-accepting position.

In many instances, the row of seats immediately forward of the cargo area will be a bench seat that is split into two or more seats, or simply may be two independent seats, the backs of which in either case are independently pivotable. The vehicle for which the cargo liner 100 illustrated in FIGS. 1-7 is made is one such. Therefore, cargo liner 100 has a third accordion pleat 130 whose rear margin 132 is connected to the floor panel front margin 104 by a fourth hinge 134. A front margin 136 of the third pleat 130 is connected to a rear margin 138 of a fourth accordion pleat 140 by a fifth hinge 142. A front margin 144 of the fourth pleat 140 is connected to a rear (bottom) margin 146 of a second seat back panel 148 by a sixth hinge 150. A front (top) margin 152 of the second seat back panel 150 is remote from rear (bottom) margin 146.

In one embodiment, the fore-and-aft lengths of pleats 108 and 118 are about the same, and the fore-and-aft lengths of pleats 130 and 140 are about the same. While in the illustrated embodiment the lengths of the four pleats 108, 118, 130 and 140 are all about the same, this will not be the case if the range of forward translation of one seat back is not the same as the other seat back. In the latter instance, one pair of accordion pleats may be longer in a fore and aft direction than the other pair.

Hinges 110, 114, 126, 134, 142 and 150 are all elongate, are all transversely disposed, and are all parallel to each other. Hinges 110, 114, 126, 134, 142 and 150 are mostly laterally coextensive with the pleats and panels that they respectively connect, so as to provide an enhanced barrier to water and dirt. In the illustrated embodiment, wherein the degree of rotation and the amount of forward travel of the left and right back row seats is about the same, in the unfolded configuration first hinge 110 will be coaxial with fourth hinge 134, second hinge 114 will be coaxial with fifth hinge 142, and third hinge 126 will be coaxial with sixth hinge 150. For vehicles whose seats in the rear row do not behave similarly or articulate to the same extent, the location of the hinges may be different so that corresponding ones of them are not coaxial with each other.

A top surface 154 of the floor panel 102 may be molded with a tread or pattern in it, such as a two-dimensional array of raised, rounded rectangles 156 as shown. Rectangles 156 may also adorn a top surface 158 of first pleat 108, a top surface 160 of the second pleat 118, a top (or, sometimes, rear-facing) surface 162 of the left seat panel 124, a top surface 164 of the third pleat 130, a top surface 166 of the fourth pleat 140, and a top or rear-facing surface 168 of the right seat back panel 148. Thus, in the unfolded configuration, the rectangles 156 lend a uniform appearance to the then mostly planar and horizontal top surface. The bottom surfaces of each of these panels (seen in FIG. 2) should be an analog of the top surface unless there is a good reason to vary therefrom, and thus for each raised rectangle 156 on the top surface, there will be a corresponding rectangular depression on the bottom surface. The thickness of the part thus remains substantially uniform and close to a preselected nominal thickness, and the part encounters fewer issues during its molding from molten polymer.

The floor panel 102 has a slightly convexly curved spill ridge 170 at its rear margin, a longitudinally arranged left spill ridge 172 at its left margin, a longitudinally disposed right spill ridge 174 at its right margin, and a forward spill ridge 176 somewhat rearwardly spaced from its front margin 104. The spill ridge 176 may be sufficiently rearwardly disposed that it will be spaced from and will not interfere with the operation of the first and fourth hinges 110, 134. Each of the spill ridges is raised above the panel top surface around it and is meant to be a dam or barrier to the lateral flow of fluid. Since the cargo liner 100 is meant to be rolled up from the rear to the front (or vice versa) into a tube for shipping, the transversely disposed spill ridge 176 may be more prominent that marginal spill ridges 172-174.

Similarly, the left seat back panel 124 may have a peripheral spill ridge 178 near its forward, left and right margins, and the right seat back panel 148 may have a peripheral spill ridge 180 near its forward, left and right margins. These peripheral spill ridges act to restrict the flow of fluid when the cargo liner is in the unfolded configuration. The pleats 108, 118, 130 and 140 have no such spill ridges, as these might interfere with the operation of the hinges.

As will be explained in more detail below, at least the front portion of floor panel 102 should be laid on or affixed to the cargo floor area, the left seat back panel 124 should be affixed to a seat back of a left seat in the rearmost row of the vehicle, and the right seat back panel 148 should be affixed to a seat back of a right seat in the rearmost row of the vehicle. This can be done, for example, by hook and loop fasteners, components of which may be adhered to the cargo liner 100, the vehicle cargo area and the seat backs by the user. In this illustrated embodiment, floor panel 102 has three circles 182 embossed on its top surface 154 near forward margin 104, as guides for the consumer to place the hook and loop fasteners. The top surface 162 of the relatively wide left seat back panel 124 has six such positioning circles 182, and the top surface 168 of the relatively narrow right seat back panel 148 has four such positioning circles 182, both molded as slightly proud features on the top surfaces of these panels. The applied hook and loop fasteners may be disks that match these circles, or they may be squares or any other convenient shape, and their areas may exceed the areas of the circles shown. For example, the hood and loop material may occupy the area of the rectangles 156 in which they are sited.

Left seat back panel 124 has two child restraint windows 184 and right seat back panel 148 has one such child restraint window 184. The position of windows 184 are such that they allow access to standard ISOFIX hold downs on the rear of the vehicle seat back. As furnished to the consumer, these windows 184 are closed, but they may be trimmed out by the consumer if access to underlying child restraint hardware in the seat backs is needed.

While the illustrated cargo liner 100 has two seat back panels 124 and 148 capable of independent articulation, other embodiments of the cargo liner may have three or more seat back panels, with a set of pleats for each such independent seat back panel. As shipped to the consumer, all such seat back panels may be temporarily attached to each other along adjacent sides by webs of material (not shown) that are cut out by the consumer before use.

Figure 2:
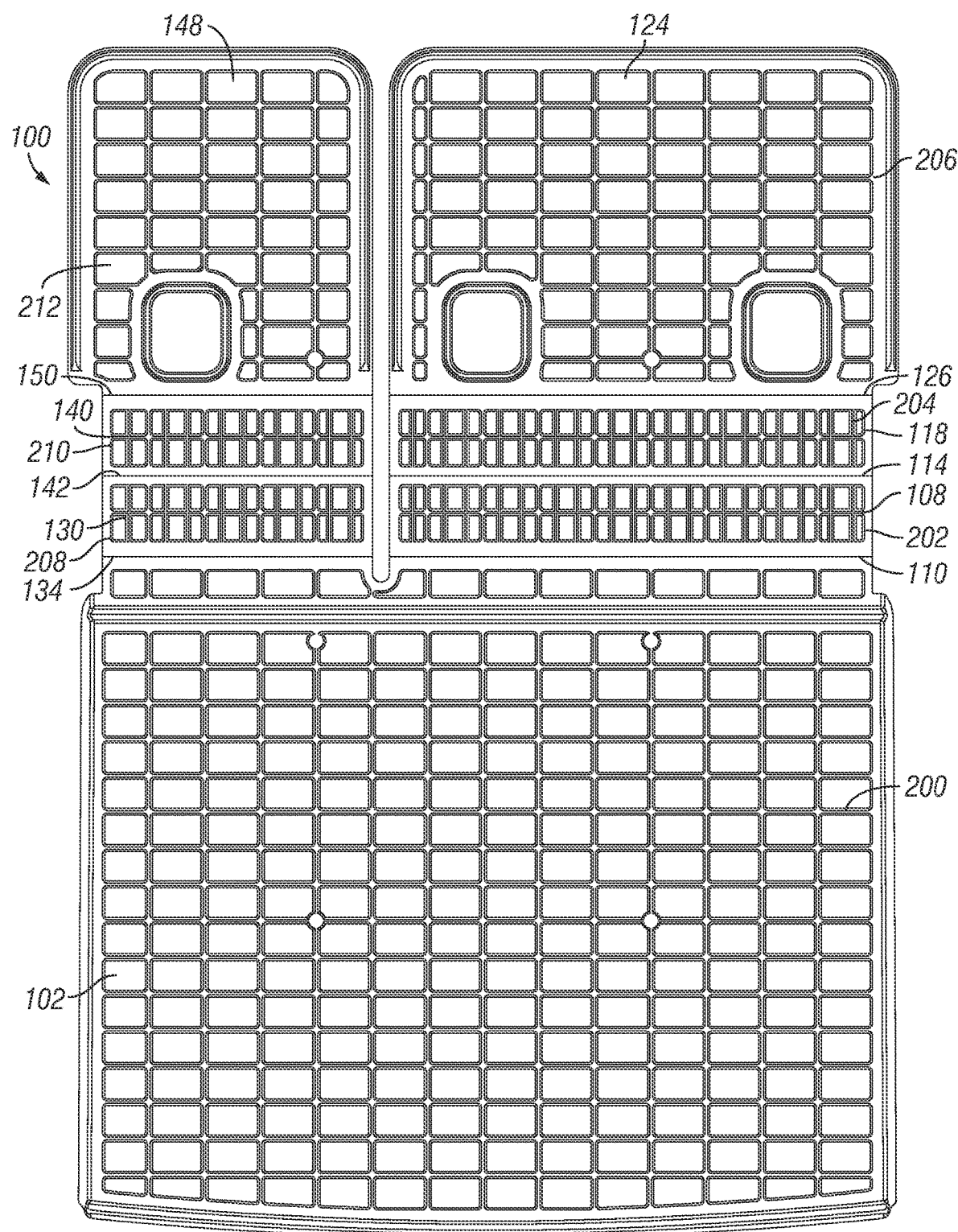
FIG. 2 is a bottom view of the cargo liner in the configuration depicted in FIG. 1.

FIG. 2 shows the bottom of cargo liner 100 in the unfolded configuration. As explained, for the most part the features in the bottom surfaces shown here are largely analogs or mathematical projections of similar features in the top surfaces, so as to retain nominal thickness throughout most of the liner 100, but there are critical exceptions as will be explained below. The floor panel 102 has a bottom surface 200. The first pleat 108 has a bottom surface 202. The second pleat 118 has a bottom surface 204. The left seat back panel 124 has a bottom surface 206. The third pleat 130 has a bottom surface 208. The fourth pleat 140 has a bottom surface 210. And the right seat back panel 148 has a bottom surface 212. In use, panels and pleats 108, 118 and 124 are connected to panels and pleats 130, 140 and 148 only through floor panel 102.

Figure 3:
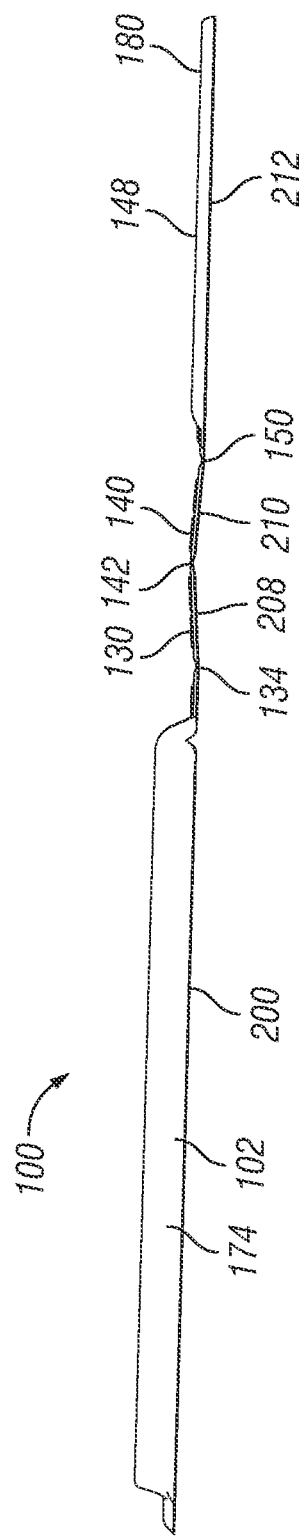
FIG. 3 is a side view of the cargo liner in the configuration depicted in FIG. 1.

FIG. 3 is a right side view of cargo liner 100 in an unfolded configuration, and in the configuration it would assume if the vehicle's right seat were folded down. The bottom surfaces 200, 212 substantially conform to the same horizontal plane. The bottom surfaces 208, 210 of respective third and fourth pleats 130, 140 are also substantially flat, but in one embodiment intentionally are not perfectly so. In the illustrated embodiment, and as initially molded, the third pleat 130 cants slightly upward from its rear to its front margin, and the fourth pleat 140 cants slightly downward from its rear to its front margin. First and second pleats 108, 118 have similar dispositions when the left seat is placed into a cargo area-extending position.

Figure 4:
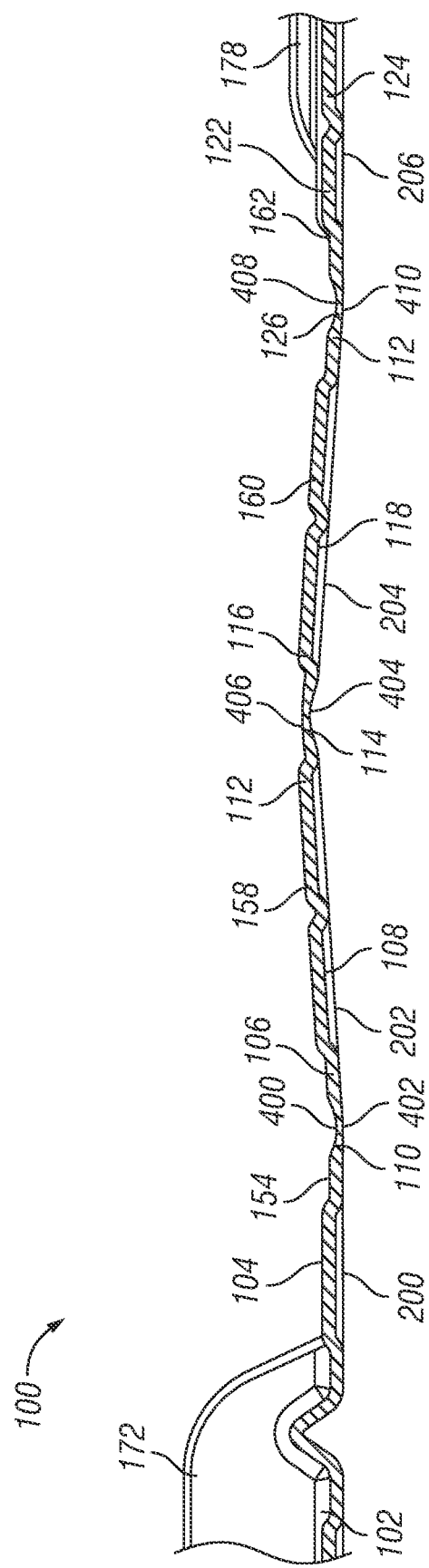
FIG. 4 is a magnified sectional view taken substantially along line 4-4 of FIG. 1.

This relationship and other structures can be more clearly seen in FIG. 4, which is a magnified sectional detail of the left pleats 108 and 118 and connecting first, second and third hinges 110, 114 and 126. The sectional view seen here will be substantially the same as any longitudinal sectional view taken through pleats 108 and 118, and hinges 110, 114 and 126, along their widths. Any longitudinal sectional view take through third and fourth pleats 130 and 140, and connecting hinges 134, 142 and 150, will also be similar to this view and to the side view shown in FIG. 3 when pleats 130 and 140 and right seat back panel 148 are in the unfolded configuration.

At least in the pleat and hinge area of the cargo liner 100, the thicknesses of the panels and pleats are substantially uniform. A thickness between surfaces 154 and 200 of the floor panel 102, a thickness between surfaces 158 and 202 of first pleat 108, a thickness between surfaces 160 and 204 of second pleat 118, and a thickness between surfaces 162 and 206 of the left seat back panel 124, at least as measured near the hinges 110, 114 and 126, are substantially the same. In the illustrated embodiment, the nominal thicknesses of these pleats and panels may be about 0.125 in.

A thickness of each hinge 110, 114 and 126 between the top and bottom surfaces thereof is thinner than the thicknesses in the neighboring regions of panels and pleats 102, 108, 188 and 124. For example, a thickness of each of the hinges 110, 114 and 126, and corresponding hinges 134, 142 and 150, may be about 0.055 in. Hinge 110 has an upwardly concave top surface 400 and a bottom surface 402 that is substantially continuous and coplanar with neighboring panel surfaces 200 and 202. This is done because hinge 110 folds upwardly. Hinge 114 has a downwardly concave lower surface 404 and an upper surface 406 that is substantially continuous and coplanar with neighboring panel surfaces 158 and 160. This preferential thinning out of hinge 114's bottom portion is done because hinge 114 folds downwardly. Finally, upper surface 408 of hinge 126 is upwardly concave, while lower surface 410 of hinge 126 is substantially continuous and coplanar with neighboring panel lower surfaces 204 and 206. This nonsymmetrical thinning out of the top region of hinge 126 is done because hinge 126 folds upwardly.

In the illustrated embodiment, and in the unfolded configuration, panel 102 and pleat 108 are not coplanar, but at a large obtuse angle. Similarly, pleats 108 and 118 are separated by a large obtuse angle, and pleat 118 and panel 124 are separated by a large obtuse angle. As molded and in the unfolded configuration, an angle between floor panel 102 and first pleat 108 may be about 176 degrees, an angle between first pleat 108 and second pleat 118 may be about 175 degrees, and an angle between second pleat 118 and left seat back panel 124 may be about 176 degrees. In use, and for some vehicles as used in some environments, stretching may occur between panels 124 and 102 when the seat back to which panel 124 is attached is lowered to its cargo area extending configuration, and this would have a tendency to flatten out pleats 108 and 118. This may occur, for example, at relatively cold temperatures, to take into account the coefficient of thermal expansion of the polymer used. In other embodiments, cargo liner 102 could be initially molded so that panels and pleats 102, 108, 118 and 124 are perfectly flat in an unfolded configuration.

Panels and pleats 130, 140 and 148, and connecting hinges 134, 142 and 150, have dimensions and structure similar to those described above. The upper surfaces of hinges 134 and 150 will be upwardly concave. The lower surface of hinge 142 will be downwardly concave. The only difference between these sets of panels/pleats and hinges is their transverse width, as the left seat back in this embodiment is wider than the right seat back.

Figure 5:
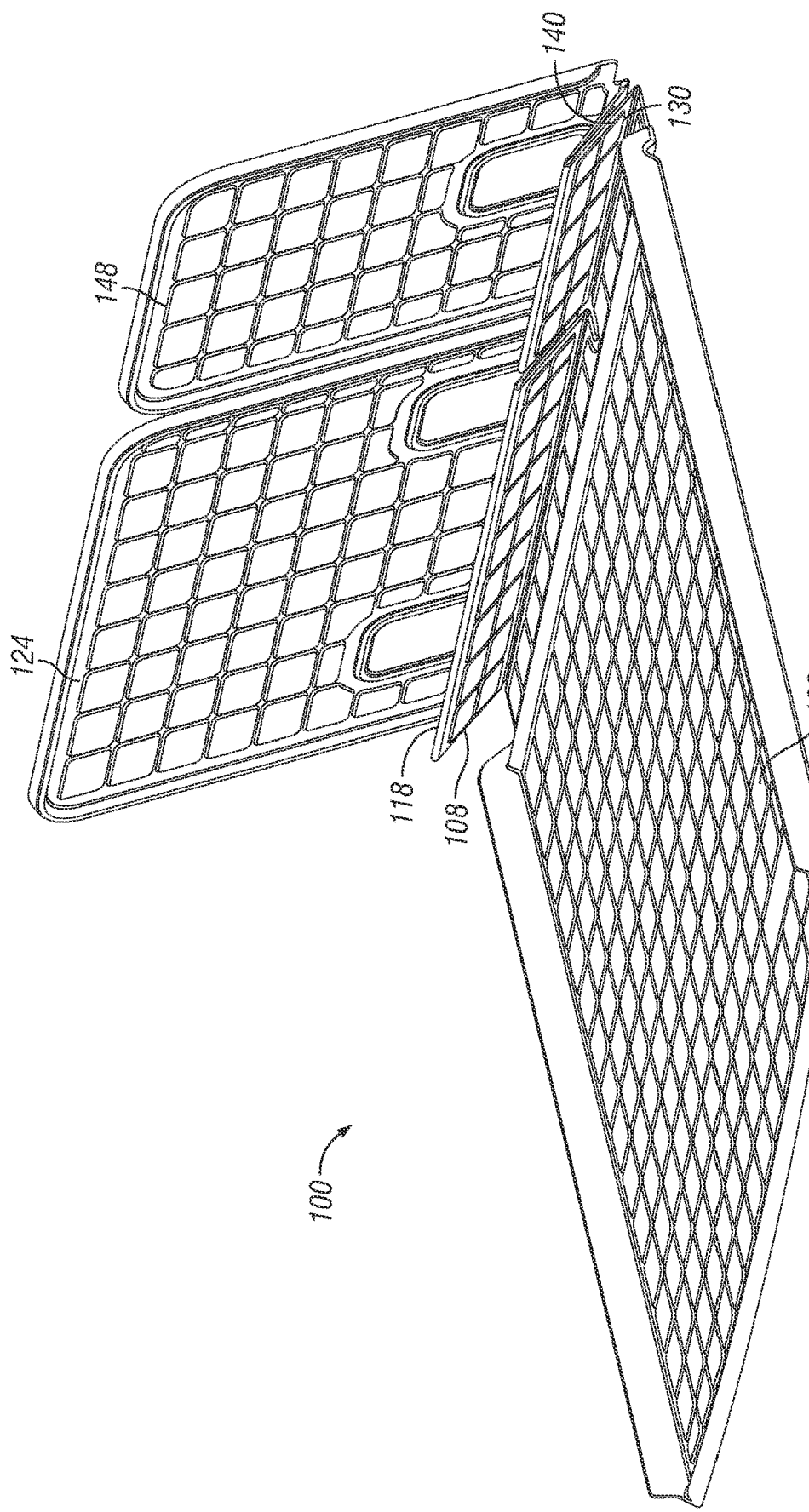
FIG. 5 is a top perspective view of the hinged cargo liner of FIGS. 1-5, but in a folded configuration.

FIG. 5 shows the cargo liner 100 in a second, folded configuration. In this configuration, the first pleat 108 has been folded to make an acute angle with floor panel 102. The second pleat 118 is folded forwardly and down, so as to be nearly adjacent to the first pleat 108, and so as to form an acute angle between them. The first seat back panel 124 is disposed so as to tilt rearwardly from its bottom margin to its top margin, so that the panel conforms to the orientation of a seat back (not shown) for a seat to be occupied by a passenger. The seat back panel 124 therefore makes an acute angle with the second pleat 118. In the illustrated configuration, the second seat back panel 148 is tilted back from the vertical by the same angle as that of seat back panel 124. For this vehicle (a 2019 Jeep Cherokee), the back row of seats may be forwardly rotated and displaced by the same amount until the seat backs are planar with the cargo area floor. Therefore, and in the folded configuration shown, fourth hinge 134 will be coaxial with first hinge 110, the third pleat 130 will be coplanar with first pleat 108, the fourth pleat 140 will be coplanar with second pleat 118, fifth hinge 142 will be coaxial with second hinge 114, and sixth hinge 150 will be coaxial with third hinge 126. In this folded configuration, third pleat 130 makes an acute angle with floor panel 102, fourth pleat 140 makes an acute angle with third pleat 130, and the right seat back panel 148 makes an acute angle with the fourth pleat 148.

Figure 6:
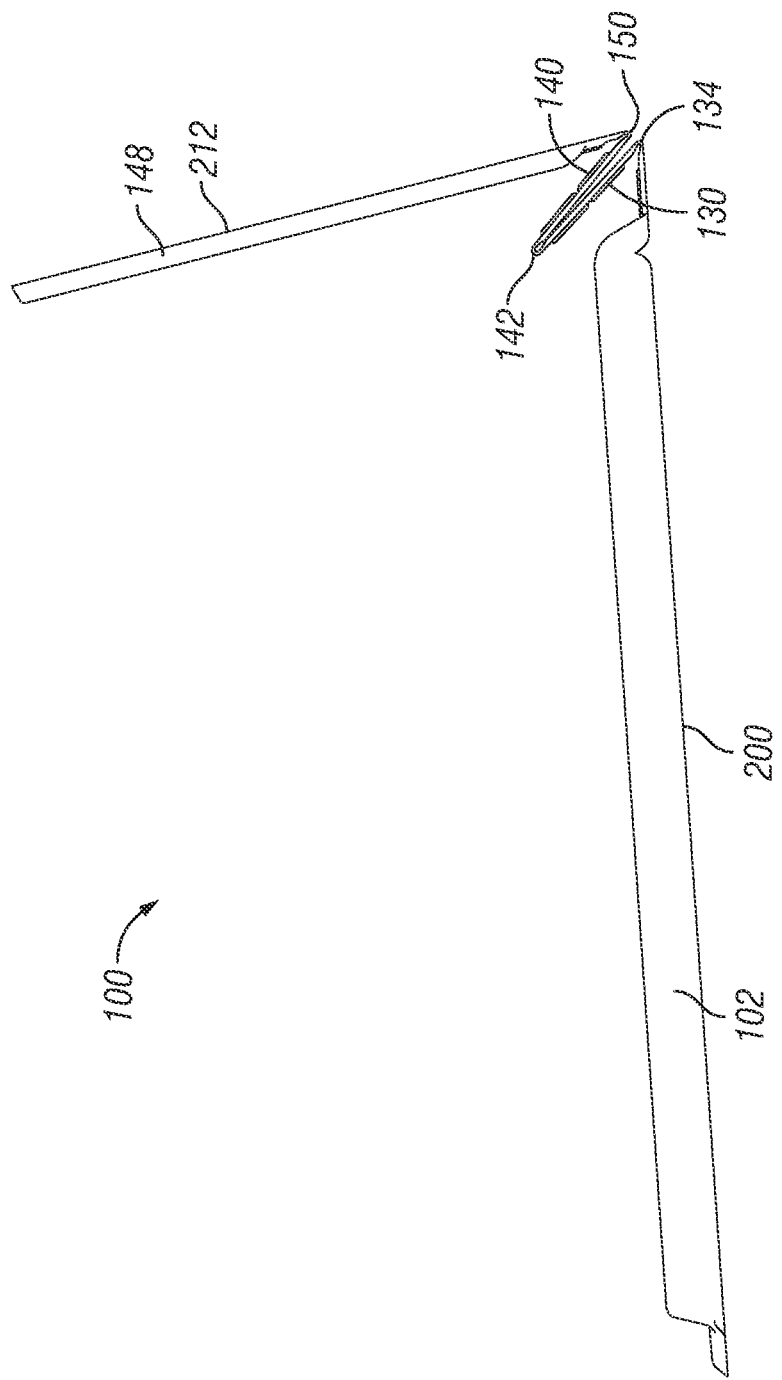
FIG. 6 is a side view of the hinged cargo liner in the configuration shown in FIG. 5.
Figure 7:
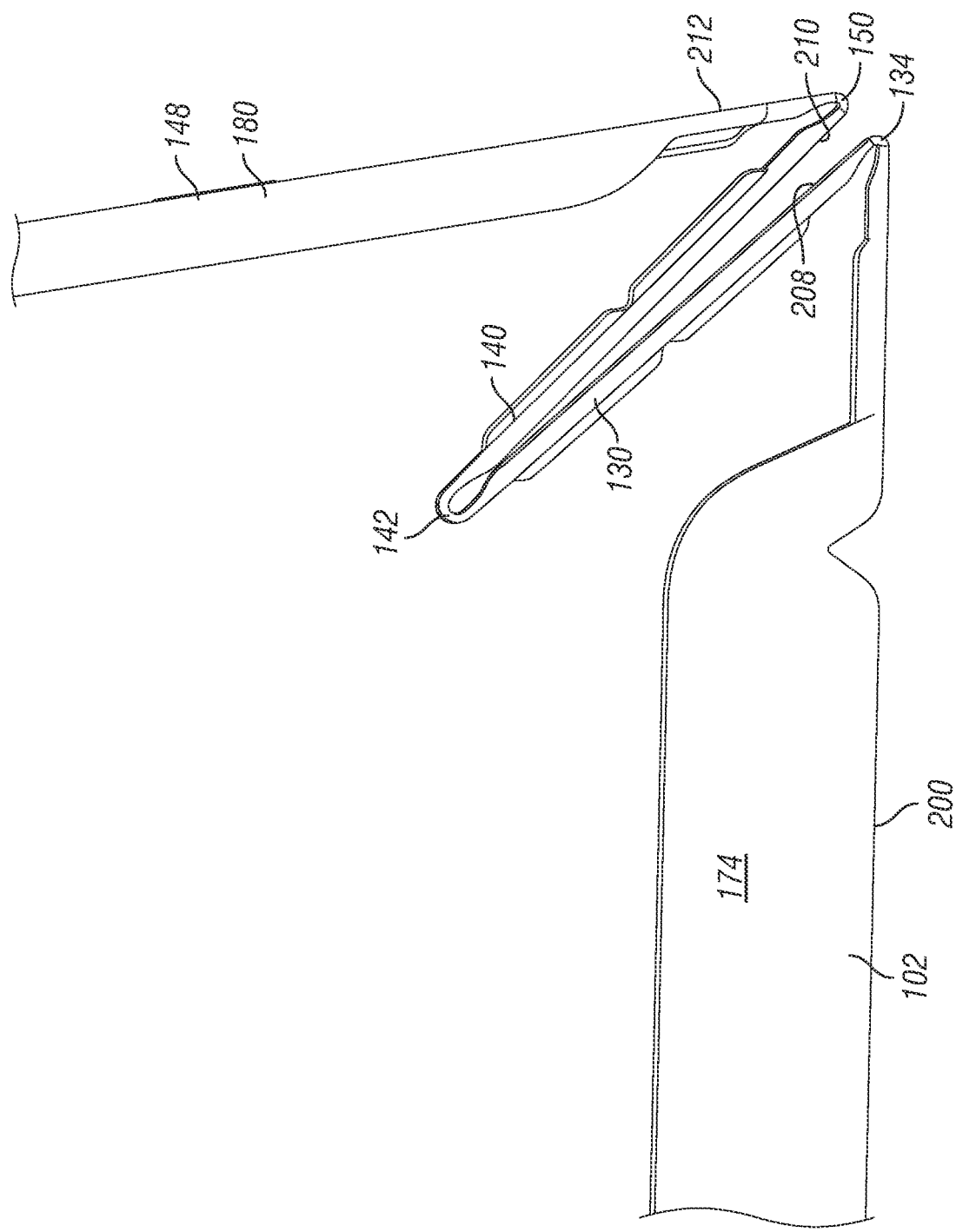
FIG. 7 is a magnified detail of FIG. 6, showing hinge structure in this folded configuration.

FIG. 6 is a right side view of the cargo liner seen in FIG. 5, and FIG. 7 is a detail of FIG. 6 in the pleat/hinge area. In the illustrated folded configuration, in which the right seat back is tilted rearwardly by a small extent, the angle between floor panel lower surface 200 and third pleat lower surface 208 may be about 46 degrees, the angle between the third pleat lower surface 208 and the fourth pleat lower surface 210 may be about three degrees, and the angle between the fourth pleat lower surface 210 and the right seat back panel "lower" surface 212 may be about 37 degrees.

In some vehicles of this kind, the angles of the seat backs of the rear row of seats are adjustable by the user. The seat back angle may be adjusted from a vertical or nearly-vertical disposition to one in which the seat back is significantly reclined. The accordion pleat structure of the invention easily accommodates these seat back angle adjustments; as the panel 148 is backwardly reclined more, the angles between panel 148 and pleat 140 and between pleat 130 and panel 102 will get smaller. Conversely, when the seat back panel 148 is made more vertical, the angles between pairs of the panels/pleats 102, 130, 140 and 148 will begin to open up.

Figure 8:
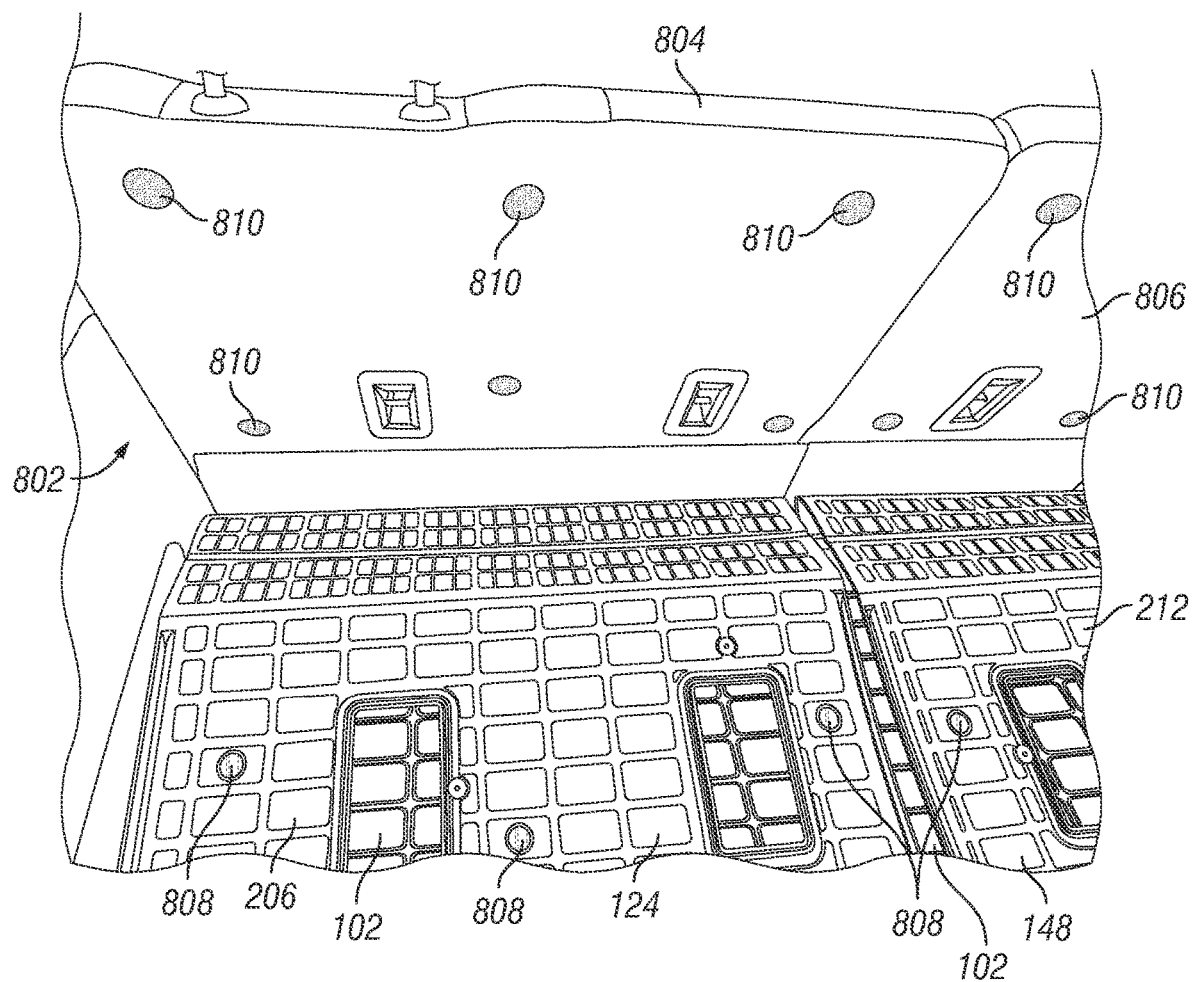
FIG. 8 is a top rear perspective view of a cargo liner according to the invention as installed into the cargo area of a vehicle, seat back panels having been detached from respective seat backs for purposes of illustration.
Figure 9:
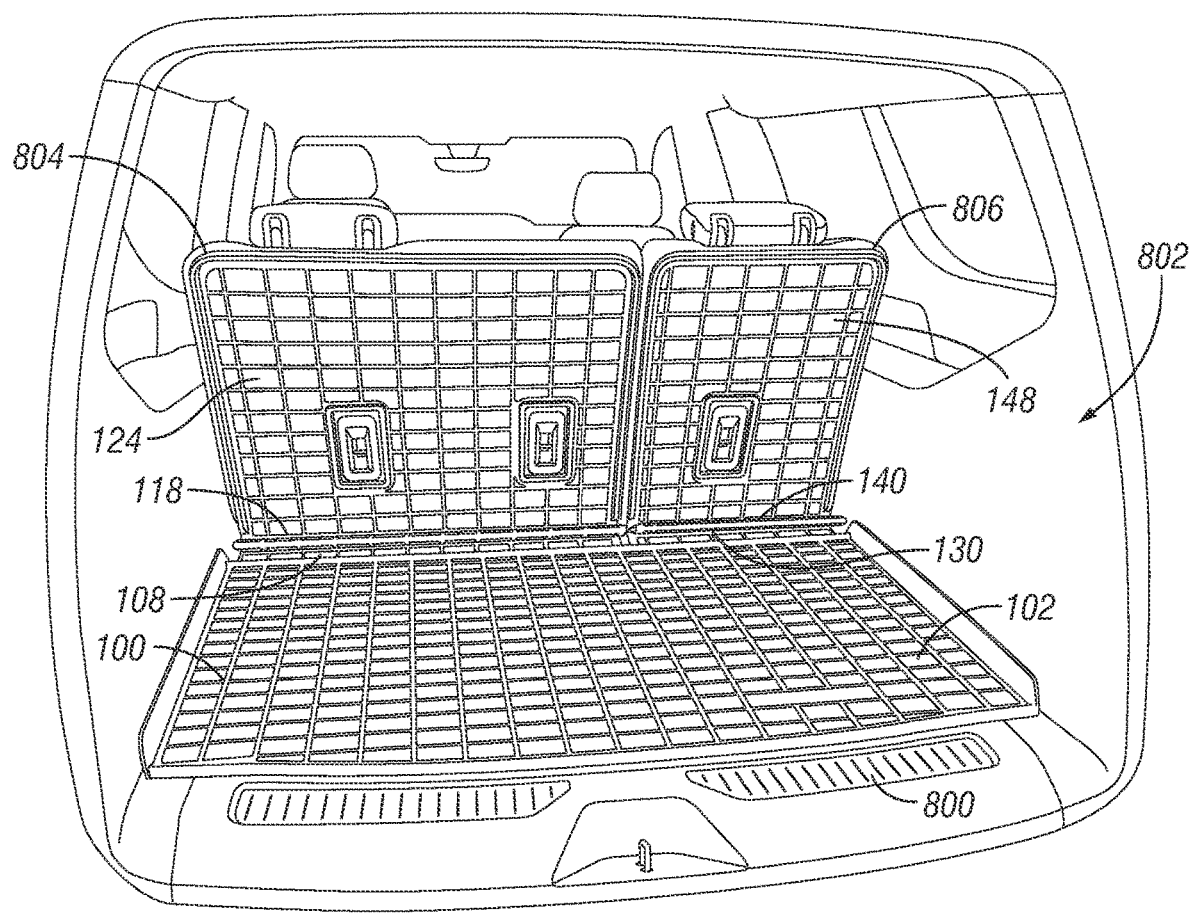
FIG. 9 is a top rear perspective view of a cargo liner installed in the cargo area of a vehicle, with seat backs in an upright position.
Figure 10:
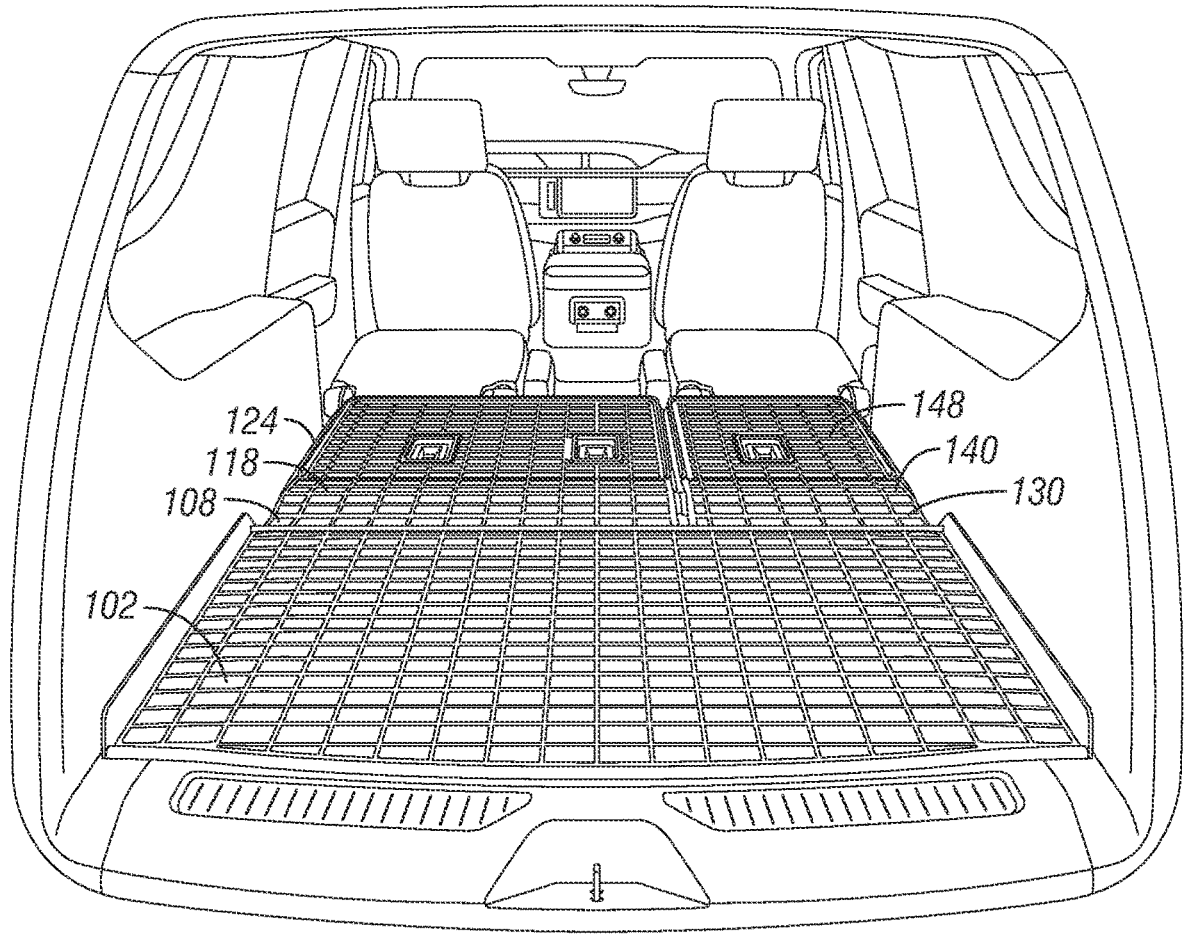
FIG. 10 is a top rear perspective of the cargo liner shown in FIG. 9, but in an unfolded configuration that conforms to seat backs when they are pitched forward so as to forwardly extend the cargo area of the vehicle.

FIGS. 8-10 are rear perspective views of the cargo area of a 2021 GMC Yukon, and of a cargo liner custom-designed to fit it. The liner depicted in these views is not the same as the liner illustrated in FIGS. 1-7, and has different lateral dimensions. Nonetheless, because the cargo liner in FIGS. 8-10 has the same functional structures as the cargo liner in FIGS. 1-7 and operates the same way, many of their components are given the same characters herein.

In FIG. 8, the cargo liner floor panel 102 has been installed on a floor 800 (see FIG. 9) of a vehicle cargo area 802. This may be done with the aid of hook and loop fasteners (not shown), as described above. This vehicle has a left seat back 804 which is split from a right seat back 806, so that the seat backs may be independently moved from a passenger-accepting position shown here to a cargo-area extending position (FIG. 10). The left seat back 804 is much wider than the right seat back 806, and therefore left seat back panel 124, and the connecting first and second pleats 108, 118, are much wider than right seat back panel 148 and its connecting third and fourth pleats 130, 140.

Disks 808 of hook or loop material have been applied as by an adhesive to the lower surface 206 of seat back panel 124 and to the lower surface 212 of the right seat back panel 148. Mating disks 810 of loop or hook material have been applied to corresponding locations on the seat back 804 and the seat back 806. As previously mentioned, the portions 808-810 of hook and loop material may take other shapes, such as squares or rectangles, and may be more extensive in size.

One method of installation of the cargo liner 100 is as follows. The liner 100 is shipped to the consumer as a rolled-up tube, with hook and loop fastener pairs 808, 810 already attached to the underside of the liner. Upon receipt the consumer unrolls the liner 100 and allows it to lie flat. The consumer trims out the web (not shown) between seat back panels 804 and 806, so that they may independently articulate. If the vehicle is going to be used with a child seat in the last row of seats, windows for two or more of the ISOFIX hold downs are trimmed out, as are any holes for cargo hooks or the like. The vehicle seat backs 804, 806 are folded forwardly and down, to take the positions shown in FIG. 10. The consumer next positions the liner 100 on the floor 102 and on the seat backs 804, 806. Then, the consumer removes backing paper (not shown) from the forward/downward surfaces of hook and loop pieces of material 810. Then the consumer firmly presses the hook and loop fasteners 808/810 against each seat back 804, 806. Ideally the hook and loop fasteners 808/810 and seat backs 804, 806 are left in a flat position for a minimum of 48 hours, to make sure that the fastener elements 810 adhere and stay attached to the seat backs 804, 806. After this time, the consumer may freely remove liner 100 from the vehicle by detaching the fasteners 808 from the fasteners 810, and may reinstall the liner 100 by reattaching fasteners 808 to fasteners 810. Optionally similar hook and loop fasteners may be used to attach floor panel 102 to cargo area floor 800.

In FIGS. 9 and 10, the installation of cargo liner 100 into the vehicle cargo area 802 is complete. In FIG. 9, seat backs 804 and 806, and therefore seat back panels 124 and 148, are raised into a passenger-accepting position, in which passengers may sit in the second (or last) row of seats. In this configuration, pleats 108 and 118, and pleats 130 and 140, are folded nearly together.

In FIG. 10, seat backs 804, 806 have been folded down and forward into a cargo area extending configuration, and therefore seat back panels 124 and 148 have been rotated and displaced forwardly with them. The forward displacement of seat back panels 124 and 148 causes pleats 108, 118 and 130, 140 to open out and forwardly extend, until they are flat or nearly so, thereby presenting a longitudinally continuous, protected and extended cargo area floor surface. Of course, the consumer may freely choose to lower one of the seat backs 804, 806 and not the other one.

Figure 11:
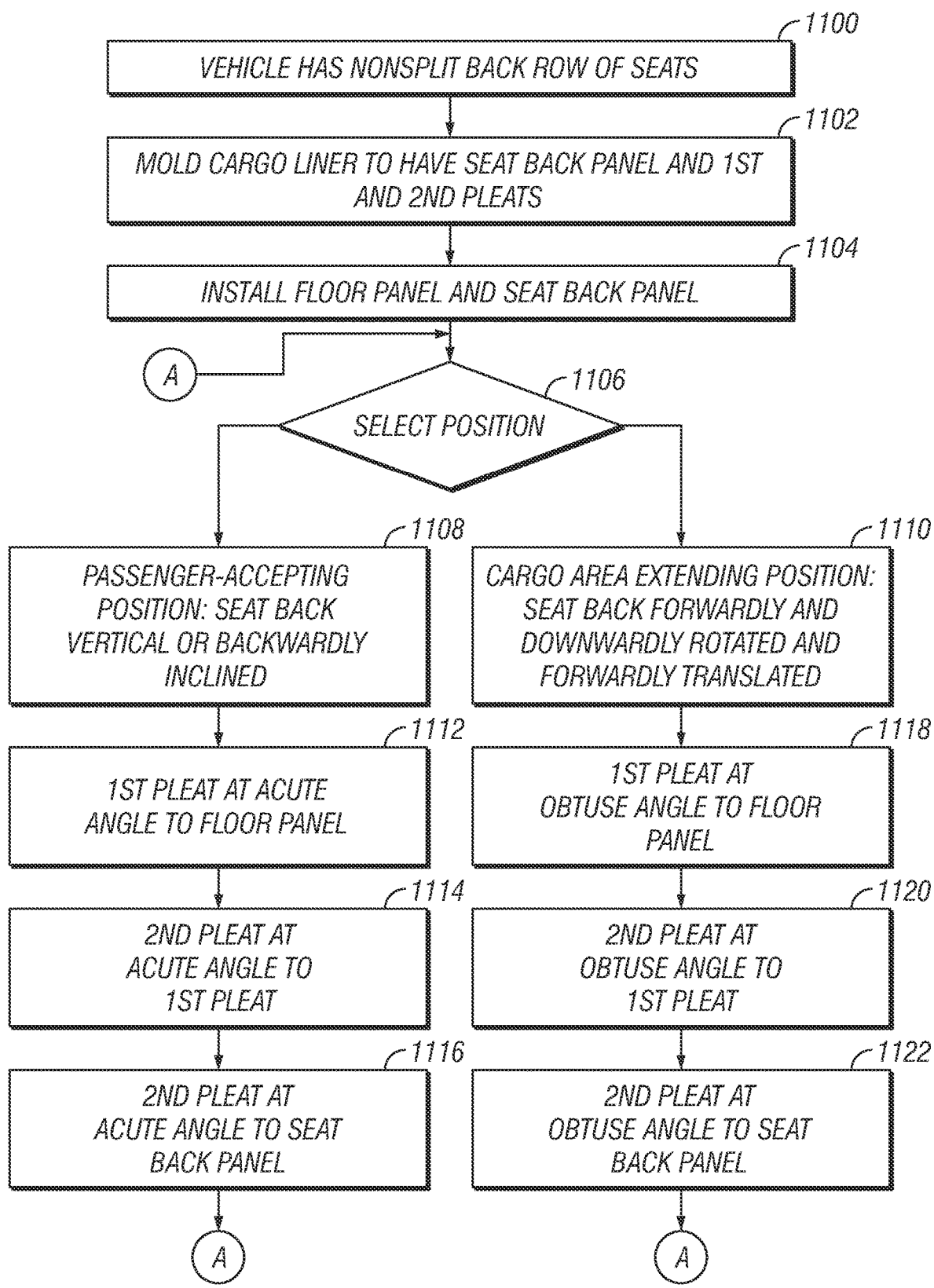
FIG. 11 is a block diagram illustrating a method of manufacturing, installing and using a cargo liner according to the invention for a vehicle with a nonsplit back row of seats.

FIG. 11 is a block diagram of a method of manufacture, installation and use of an embodiment of the invention supplied for a vehicle in which the row of seats bounding the cargo area is not split (step 1100). At step 1102, a cargo liner is manufactured to have a floor panel, a single seat back panel, and first and second accordion pleats connecting the floor panel to the seat back panel. At step 1104, the user releasably adheres the floor panel of the cargo liner to the cargo area floor, and releasably adheres the seat back panel to the seat back.

At decision step 1106, the user selects one of a passenger-accepting position (1108) or a cargo area-extending position (1110). If the user selects the passenger-accepting position (1108), the user positions the seat back to a position that may be vertical or rearwardly inclined by various extents. Responsive to this, the first pleat assumes, or is already at, an acute angle to the floor panel (1112). Further, the second pleat assumes, or is already at, an acute angle to the first pleat (1114), and the seat back panel assumes, or is already at, an acute angle to the seat back panel (1116).

If the user selects the cargo area-extending position (1110), the user folds the seat back forwardly around its hinge, and also forwardly translates the seat back, until the seat back is substantially coplanar with the cargo area floor. Responsive to this, the first pleat opens out to an obtuse angle with the floor panel (1118), the second pleat opens out to an obtuse angle with the first pleat (1120), and the second pleat opens out to an obtuse angle with the seat back panel (1122). These obtuse angles may approach, or even be the same as, 180 degrees, depending on the vehicle involved.

Once the user has elected a certain configuration for the seat back, he or she may later want to change it. When this happens, and as shown by connectors A, the method loops back to position selection step 1106.

Figure 12:
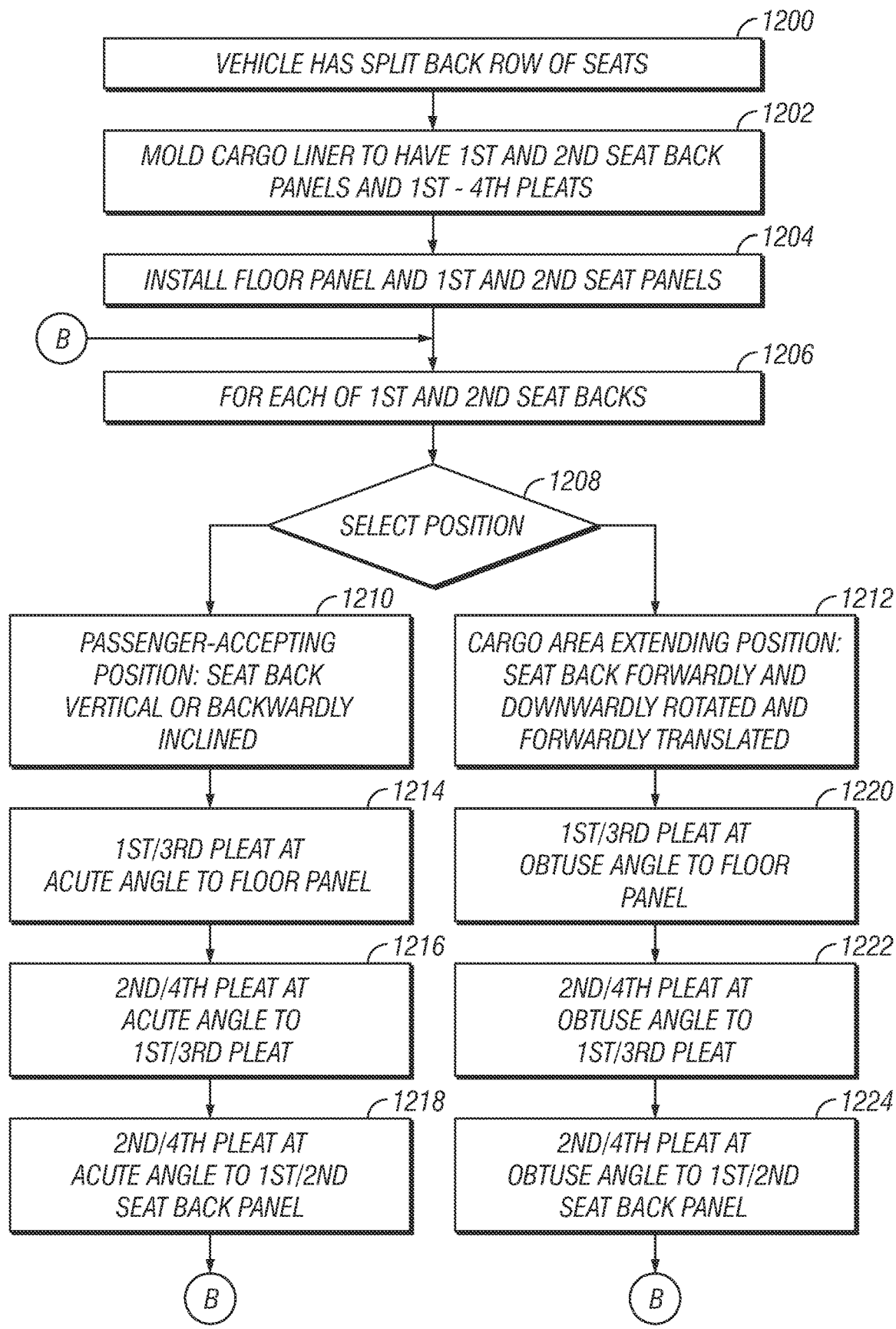
FIG. 12 is a block diagram illustrating a method of manufacturing, installing and using a cargo liner according to the invention for a vehicle having a split back row of seats.

FIG. 12 is a block diagram similar to FIG. 11, but applicable to a vehicle that has a split row of seats adjacent the front boundary of the vehicle cargo area (step 1200). A cargo liner is molded that has left (first) and right (second) seat back panels, with first and second accordion pleats connecting the first seat back panel to the floor panel, and third and fourth accordion pleats connecting the second seat back panel to the floor panel (step 1202). At step 1204, a consumer installs the cargo liner thus manufactured into the cargo area of a vehicle, as previously described, by attaching to the floor panel to the vehicle cargo area floor and both seat panels to respective seat backs of the left and right seats.

The process steps that follow are done, independently, for the left and right seat backs (1206). At step 1208, the consumer decides whether the seat back in question should be placed in a passenger-accepting position (1210) or in a cargo area-extending position (1212). Responsive to placing the selected seat back in a passenger-accepting position, at step 1214 the first or third pleat assumes an acute angle with the cargo liner floor panel. At step 1216, the second or fourth pleat assumes an acute angle with the first/third pleat. And at step 1218, the second/fourth pleat assumes an acute angle to the left or right seat back panel. A passenger-accepting position is illustrated in FIGS. 5-7 and 9.

If a cargo area-extending position is selected at 1212, the user will rotate forward and down, and forwardly displace, the selected seat back, and in the illustrated embodiments the seat back will become coplanar with the cargo area floor. Responsive to this, the pleats will open out and expand. At step 1220, the $1^{st}/3^{rd}$ pleat will assume an obtuse angle with the floor panel. At step 1222, the $2^{nd}/4^{th}$ pleat will assume an obtuse angle with the $1^{st}/3^{rd}$ Pleat. And at step 1224, the $2^{nd}/4^{th}$ pleat will assume an obtuse angle with the selected first or second seat back panel. A cargo area-extending position is illustrated in FIGS. 1-4 and 10.

If the user decides to change the position of another seat back, or to alter the position of the present seat back, the process loops back by connectors B to a point before step 1206.

In summary, a hinged cargo liner has been shown and described. The cargo liner covers both the cargo area floor and the backs of the row of seats forwardly adjacent the cargo area. By use of accordion pleats, the invention permits the articulation of the back row seat back(s) from a passenger-accepting position to a cargo-extending position while maintaining a longitudinally continuous barrier to mud and dirt. The angle of each seat back may be independently adjusted.

While embodiments of the present invention have been described and illustrated in the above detailed description and accompanying drawings, the present invention is not limited thereto but only by the scope and spirit of the appended claims.

We claim:

1. A hinged cargo liner adapted to assume unfolded and folded configurations, the cargo liner comprising:
   a floor panel adapted to be placed on a floor of a cargo area of a vehicle, the floor panel having a front margin, a top surface and a bottom surface for placement on the floor of the cargo area, the floor panel having a substantially uniform floor panel thickness between the top surface and the bottom surface;
   a first pleat having a rear margin and a front margin, a top surface of the first pleat extending from the rear margin of the first pleat to the front margin of the first pleat, an opposed bottom surface of the first pleat extending from the rear margin of the first pleat to the front margin of the first pleat, the first pleat having a substantially uniform first pleat thickness between the top surface of the first pleat and the bottom surface of the first pleat;
   a second pleat having a rear margin and a front margin, a top surface of the second pleat extending from the rear margin of the second pleat to the front margin of the second pleat, a bottom surface of the second pleat extending from the rear margin of the second pleat to the front margin of the second pleat, the second pleat having a substantially uniform second pleat thickness between the top surface of the second pleat and the bottom surface of the second pleat,
   a seat back panel having a rear margin and a front margin, a top surface of the seat back panel extending from the rear margin of the seat back panel to the front margin of the seat back panel, a bottom surface of the seat back panel extending from the rear margin of the seat back panel to the front margin of the seat back panel, the seat back panel having a substantially uniform seat back panel thickness between the top surface of the seat back panel and the bottom surface of the seat back panel;
   a first hinge joining the front margin of the floor panel the rear margin of the first pleat, the first hinge having an upper surface forming a continuous upwardly concave arc between the front margin of the floor panel and the rear margin of the first pleat, the first hinge having a lower surface which is substantially continuous between the lower surface of the floor panel and the lower surface of the first pleat, a thickness of the first hinge varying as a function of distance from the front margin of the floor panel and having a single minimum smaller than the floor panel thickness and the first pleat thickness;
   a second hinge joining the front margin of the first pleat to the rear margin of the second pleat, the second hinge having an upper surface which is substantially continuous between the upper surface of the first pleat and the upper surface of the second pleat, the second hinge having a lower surface forming a continuous downwardly concave arc between the lower surface of the first pleat and the lower surface of the second pleat, a thickness of the second hinge varying as a function of distance from the front margin of the first pleat and having a single minimum that is smaller than the first pleat thickness and the second pleat thickness; and
   a third hinge joining the front margin of the second pleat to the rear margin of the seat back panel, the third hinge having an upper surface forming a continuous upwardly concave arc between the front margin of the second pleat to the rear margin of the seat back panel, the third hinge having a lower surface which is substantially continuous between the lower surface of the second pleat and the lower surface of the seat back panel, a thickness of the third hinge varying as a function of distance from the front margin of the second pleat and having a single minimum smaller than the second pleat thickness and the seat back panel thickness; wherein
   in the folded configuration of the hinged cargo liner, an angle between the first pleat and the second pleat is within a range including three degrees; and wherein, when the cargo liner is in the unfolded configuration and as molded, the bottom surfaces of the floor and seat back panels substantially conform to a horizontal plane, the bottom surface of the first pleat is upwardly inclined from the rear margin of the first pleat to the front margin of the first pleat, and the bottom surface of the second pleat is slightly downwardly inclined from the rear margin of the second pleat to the front margin of the second pleat.

2. The hinged cargo liner of claim 1, wherein the cargo liner is integrally injection-molded using a thermoplastic elastomer.

3. The hinged cargo liner of claim 1, wherein the floor panel thickness, the first pleat thickness, the second pleat thickness and the seat back panel thickness are substantially the same.

4. A hinged cargo liner adapted to assume unfolded and folded configurations, the cargo liner comprising:
- a floor panel adapted to be placed on a floor of a cargo area of a vehicle, the floor panel having a front margin, a top surface and a bottom surface for placement on the floor of the cargo area, the floor panel having a substantially uniform floor panel thickness between the top surface and the bottom surface;
- a first pleat having a rear margin and a front margin, a top surface of the first pleat extending from the rear margin of the first pleat to the front margin of the first pleat, an opposed bottom surface of the first pleat extending from the rear margin of the first pleat to the front margin of the first pleat, the first pleat having a substantially uniform first pleat thickness between the top surface of the first pleat and the bottom surface of the first pleat;
- a second pleat having a rear margin and a front margin, a top surface of the second pleat extending from the rear margin of the second pleat to the front margin of the second pleat, a bottom surface of the second pleat extending from the rear margin of the second pleat to the front margin of the second pleat, the second pleat having a substantially uniform second pleat thickness between the top surface of the second pleat and the bottom surface of the second pleat,
- a first seat back panel having a rear margin and a front margin, a top surface of the first seat back panel extending from the rear margin of the first seat back panel to the front margin of the first seat back panel, a bottom surface of the first seat back panel extending from the rear margin of the first seat back panel to the front margin of the first seat back panel, the first seat back panel having a substantially uniform first seat back panel thickness between the top surface of the first seat back panel and the bottom surface of the first seat back panel;
- a first hinge joining the front margin of the floor panel the rear margin of the first pleat, the first hinge having an upper surface forming a continuous upwardly concave arc between the front margin of the floor panel and the rear margin of the first pleat, the first hinge having a lower surface which is substantially continuous between the lower surface of the floor panel and the lower surface of the first pleat, a thickness of the first hinge varying as a function of distance from the front margin of the floor panel and having a single minimum smaller than the floor panel thickness and the first pleat thickness;
- a second hinge joining the front margin of the first pleat to the rear margin of the second pleat, the second hinge having an upper surface which is substantially continuous between the upper surface of the first pleat and the upper surface of the second pleat, the second hinge having a lower surface forming a continuous downwardly concave arc between the lower surface of the first pleat and the lower surface of the second pleat, a thickness of the second hinge varying as a function of distance from the front margin of the first pleat and having a single minimum that is smaller than the first pleat thickness and the second pleat thickness;
- a third hinge joining the front margin of the second pleat to the rear margin of the seat back panel, the third hinge having an upper surface forming a continuous upwardly concave arc between the front margin of the second pleat to the rear margin of the seat back panel, the third hinge having a lower surface which is substantially continuous between the lower surface of the second pleat and the lower surface of the seat back panel, a thickness of the third hinge varying as a function of distance from the front margin of the second pleat and having a single minimum smaller than the second pleat thickness and the seat back panel thickness; wherein
- in the folded configuration of the hinged cargo liner, an angle between the first pleat and the second pleat is within a range including three degrees;
- a third pleat having a rear margin and a front margin, the third pleat having a top surface extending from the rear margin of the third pleat to the front margin of the third pleat, an opposed bottom surface of the third pleat extending from the rear margin of the third pleat to the front margin of the third pleat, a substantially uniform third pleat thickness measured between the top surface of the third pleat and the bottom surface of the third pleat, a fourth hinge joining the rear margin of the third pleat to the front margin of the floor panel, the fourth hinge having a fourth hinge upper surface forming a continuous upwardly concave arc between the floor panel front margin and the third pleat rear margin, a fourth hinge lower surface being substantially continuous between the floor panel front margin and the third pleat rear margin, a fourth hinge thickness between the fourth hinge upper surface and the fourth hinge lower surface varying as a function of the distance from the floor panel front margin and having a single minimum that is smaller than the floor panel thickness and the third pleat thickness;
- a fourth pleat having a rear margin and a front margin, a top surface of the fourth pleat extending from the rear margin of the fourth pleat to the front margin of the fourth pleat, an opposed bottom surface of the fourth pleat extending from the rear margin of the fourth pleat to the front margin of the fourth pleat, a substantially uniform fourth pleat thickness measured between the top and bottom surfaces of the fourth pleat, a fifth hinge joining the rear margin of the fourth pleat to the front margin of the third pleat, the fifth hinge having a fifth hinge upper surface that is substantially continuous with the third pleat upper surface and the fourth pleat upper surface, a fifth hinge lower surface forming a continuous downwardly concave arc between the front margin of the third pleat and the rear margin of the fourth pleat, a fifth hinge thickness between the fifth hinge upper surface and the fifth hinge lower surface varying as a function of distance from the front margin of the third pleat and having a single minimum that is smaller than the third pleat thickness and the fourth pleat thickness; and
- a second seat back panel having a rear margin and a front margin, a top surface of the second seat back panel extending from the rear margin of the second seat back panel to the front margin of the second seat back panel, a bottom surface of the second seat back panel extending from the rear margin of the second seat panel to the front margin of the second seat back panel, a substantially uniform second seat back panel thickness measured between the top and bottom surfaces of the second seat back panel, a sixth hinge joining the front margin of the fourth pleat to the rear margin of the second seat back panel, the sixth hinge having a sixth hinge upper surface forming a continuous upwardly concave arc between the fourth pleat front margin and the second seat back panel rear margin, a sixth hinge lower surface being substantially continuous with the fourth pleat lower surface and the second back panel lower surface, a sixth hinge thickness between the sixth hinge upper surface and the sixth hinge lower surface varying as a function of the distance from the fourth pleat forward margin and having a single minimum that is smaller than the fourth pleat thickness and the second seat back panel thickness;

wherein, when the cargo liner is in the unfolded configuration and as molded, the bottom surfaces of the floor and second seat back panels are in a horizontal plane, the bottom surface of the third pleat is slightly upwardly inclined from the rear margin of the third pleat to the forward margin of the third pleat, and the bottom surface of the fourth pleat is slightly downwardly inclined from the rear margin of the fourth pleat to the forward margin of the fourth pleat.

5. The hinged cargo liner of claim 4, wherein, when the cargo liner is in the unfolded configuration, the fourth hinge is coaxial with the first hinge, the fifth hinge is coaxial with the second hinge, and the sixth hinge is coaxial with the third hinge.

* * * * *